United States Patent [19]

Lunt

[11] 4,302,476
[45] Nov. 24, 1981

[54] SULFUR DIOXIDE ADDITION TO MUST

[75] Inventor: James W. Lunt, Fresno, Calif.

[73] Assignee: Paul Masson, Inc., Saratoga, Calif.

[21] Appl. No.: 184,145

[22] Filed: Sep. 4, 1980

[51] Int. Cl.³ .............................................. C12G 1/04
[52] U.S. Cl. ..................... 426/231; 426/15;
426/319; 426/330.5
[58] Field of Search .................... 426/15, 330.4, 330.5,
426/474, 320, 335, 231, 319

[56] References Cited

U.S. PATENT DOCUMENTS

| | | | |
|---|---|---|---|
| 1,234,255 | 7/1917 | Ash | 426/330.4 |
| 1,492,964 | 5/1924 | Coombs | 426/330.5 |
| 3,041,175 | 6/1962 | Atkinson | 426/319 |

*Primary Examiner*—Joseph M. Golian
*Assistant Examiner*—George C. Yeung
*Attorney, Agent, or Firm*—Kane, Dalsimer, Kane, Sullivan and Kurucz

[57] ABSTRACT

A system and process for relatively quickly applying and evenly distributing accurate amounts of sulfur dioxide to must. The system comprises a sulfur dioxide containment vessel and means for pressurizing the sulfur dioxide in the vessel with an inert gas. Conduit means delivers the sulfur dioxide to a must flow conduit. An inert gas under relatively low pressure is introduced into the conduit for the sulfur dioxide conduit means for ultimate delivery to the must flow conduit. Metering means delivers the precise proportions of sulfur dioxide to the must flow conduit.

The process enables the introduction of precise proportions of the sulfur dioxide to the must flow conduit and the introduction of an inert gas under relatively low pressure along with the sulfur dioxide into the must. In addition to the accurate delivery of sulfur dioxide to the must, the back flow of juice from the must is prevented when the supply of sulfur dioxide is stopped as a result of the continuous flow of the relatively low pressure inert gas into the must flow conduit.

5 Claims, 1 Drawing Figure

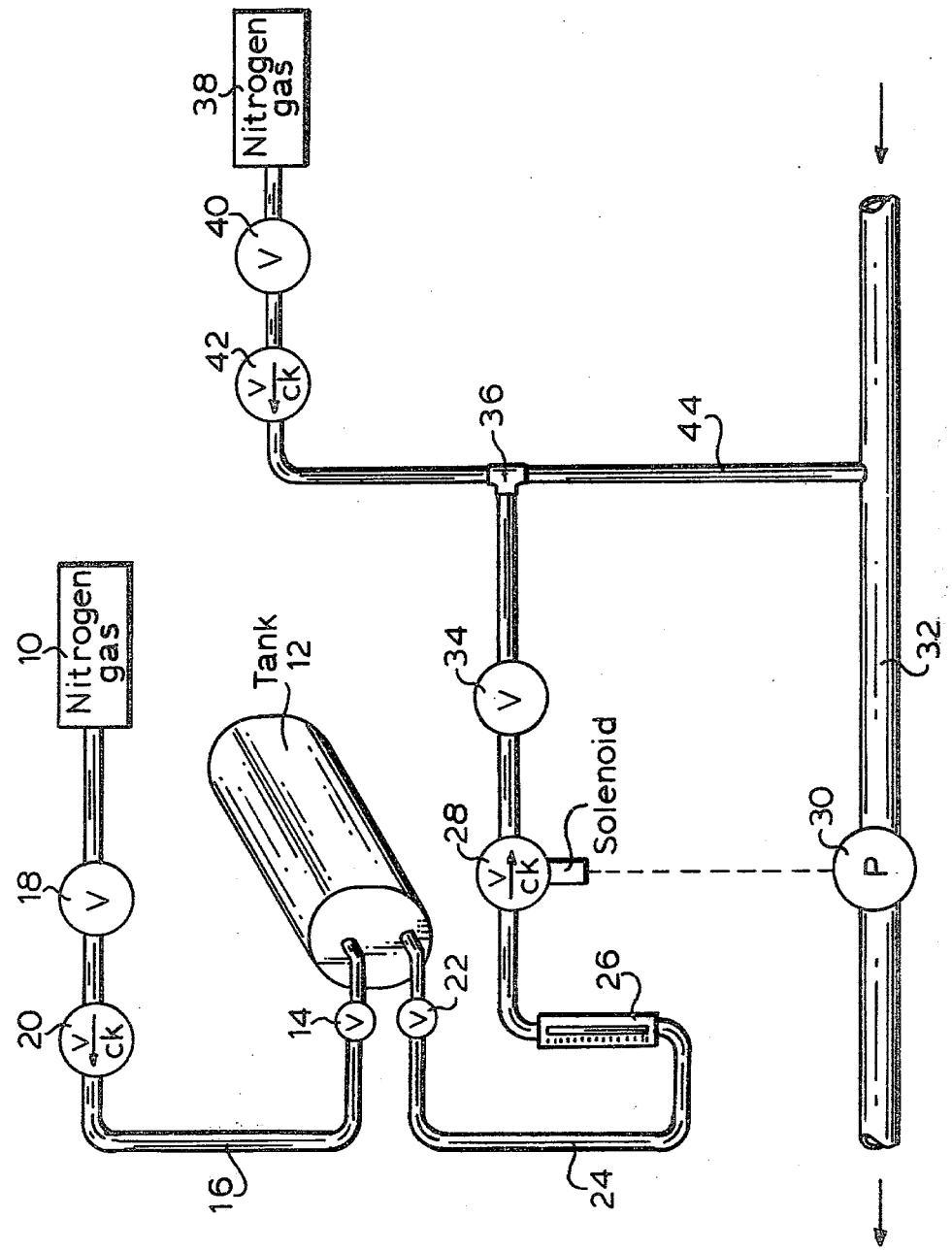

SULFUR DIOXIDE ADDITION TO MUST

BACKGROUND OF THE INVENTION

It is recognized in wine making procedures that the introduction of sulfur dioxide into must at an early stage will reduce oxidation and inhibit the growth of natural wild yeast residing in the must. Oxidation of must will result in discoloration of the must juice while the presence of wild yeast may contribute in an undesirable fashion to the organoleptic properties of the wine.

Heretofore, rather rough empirical and sometime arbitrary procedures were deployed in introducing sulfur dioxide. Even manual applications of sulfur dioxide have been employed, and only upon trial and error could the wine maker determine whether or not enough or too much sulfur dioxide was used.

Thus, there has been an ever increasing need for an automatic reproducible system and technique for introducing relatively quickly, accurately and uniformly measured amounts of sulfur dioxide into must.

SUMMARY OF THE INVENTION

A principal object of the present invention is to provide both a system and process for relatively quickly applying and evenly distributing substantially accurate amounts of sulfur dioxide continuously to must while eliminating sulfur dioxide corrosion problems and must juice back flow or migration into the system lines.

Another object is to provide a system and process of the foregoing type with a source of supply of sulfur dioxide that is maintained under substantially constant and uniform pressure independent of fluctuations in ambient temperature.

These and other objects and advantages are most effectively attained by a system and process for relatively quickly applying and evenly distributing accurate amounts of sulfur dioxide to must. The system comprises a sulfur dioxide containment vessel and means for pressurizing the sulfur dioxide in the vessel with an inert gas. Conduit means delivers the sulfur dioxide to a must flow conduit. An inert gas under relatively low pressure is introduced into the conduit for the sulfur dioxide conduit means for ultimate delivery to the must flow conduit. Metering means delivers the precise proportions of sulfur dioxide to the must flow conduit.

The process enables the introduction of precise proportions of the sulfur dioxide to the must flow conduit and the introduction of an inert gas under relatively low pressure along with the sulfur dioxide into the must. In addition to the accurate delivery of sulfur dioxide to the must, the back flow of juice from the must is prevented when the supply of sulfur dioxide is stopped as a result of the continuous flow of the relatively low pressure inert gas into the must flow conduit.

BRIEF DESCRIPTION OF THE FIGURE

The FIGURE illustrates the system and technique for sulfur dioxide addition or must according to the invention.

DETAILED DESCRIPTION OF THE PREFERRED EMBODIMENT

Proper addition of sulfur dioxide to must is an important facet of making quality wine. It has been recognized that accurate measurement, quick application and even distribution of sulfur dioxide in must are requirements of a satisfactory system. FIG. 1 illustrates a system that satisfies these requirements. In the following, this system is discussed in the order of flow, from the source of sulfur dioxide to its addition to must.

Nitrogen gas from source 10 counter pressurizes a standard one ton sulfur dioxide cylinder 12 through the upper (vapor) valve 14. Counter pressure above the sulfur dioxide vapor pressure, at the highest anticipated ambient temperature, will not allow the cylinder feed pressure to rise and fall with ambient temperature changes. The conduit 16 supplying the gas source 10 and cylinder 12 may include a stainless steel needle valve 18 and a ball check valve 20. Sulfur dioxide liquid is then fed from the lower (liquid) valve 22 of the cylinder 12 at a constant pressure through the conduit 24. This keeps the flow rate, which is pressure related, from varying. At various ambient temperatures and sun loads the vapor pressure will vary causing the flow rate to drift. By having elevated supply pressure lines, pressure drop will not drop the pressure below the vapor pressure of the liquid $SO_2$. This will prevent "gassing" in the supply line feeding the flow meter. In a successful embodiment of this invention, conduit 24 was $\frac{1}{4}''$ copper tubing.

The flow rate of sulfur dioxide is monitored by a tapered glass tube flow meter 26. The calibrations on the meter tube can be converted mathematically or empirically to parts per million of sulfur dioxide relative to must flow, or pounds sulfur dioxide per unit of time. In accordance with a successful embodiment of this invention, the meter 26 was Model 10A3365A manufactured by Fisher & Porter Co., Warminster, PA.

The valve 28 is a direct acting plunger style solenoid valve. The neoprone valve member, commonly used in this type valve, is replaced with a teflon member machined from teflon rod stock. Teflon is sulfur dioxide resistant compared to neoprene which swells and distorts. The solenoid is wired to open and close with the electrical starting control of the must pump 30 or other equipment (crusher, auger, etc.) which most suitably monitors constant must flow in must flow conduit 32, normally 6" pipe. The solenoid valve in the successful embodiment was a ASCO #826B202 solenoid valve manufactured by Automatic Switch Co., Florham Park, N.J. and having a 5/32" orifice and a substituted teflon member. The electrical coil of the solenoid should be connected to the must pump controller assuming the must pump starts and stops as the crusher hopper fills and empties. If the must pump runs continually, excess $SO_2$ will be fed while the pump idles between loads and connection should be made to some other equipment (auger, etc.) that runs only when grapes are being crushed.

The sulfur dioxide flow rate is controlled by a stainless steel needle valve 34 immediately down stream from the solenoid valve 28. The sulfur dioxide vaporizes as it passes through the needle valve 34, from a high to a low pressure environment. The location of the solenoid valve and needle valve should not be transposed or liquid will be vaporizing under the seat of the solenoid valve causing excessive wear, and the liquid vaporizing in the needle valve will freeze the solenoid valve due to the refrigeration effect. The solenoid and needle valve should be short coupled together. Excess piping between valves will allow liquid between the valves to feed $SO_2$ for a time after the solenoid closes.

The sulfur dioxide vapor flows through a tee 36, where it is joined by a flow of low pressure nitrogen gas from source 38, on its way to the must. The nitrogen, adjusted to a low flow rate by a needle valve 40, flows through ball check valve 42 and then into tee 36 with the sulfur dioxide vapor in conduit 44 and eventually bubbles out of the must. In the successful embodiment, conduit 44 was ⅜" tubing and valve 40 was model #D105NX with needle valve manufactured by Foxboro Co. Foxbow, MA. When the solenoid valve 28 closes, shutting off the flow of sulfur dioxide, the nitrogen continues to flow, slowly pushing the sulfur dioxide vapor out to the must, preventing juice from migrating back up the vapor line. Without this nitrogen flow migration becomes a severe problem due to the high solubility of sulfur dioxide. The resultant moisture in the vapor line and valve parts produce sulfurous acid which cause system corrosion. Both nitrogen lines are protected from sulfur dioxide back flow by providing corrosion resistant check valves 20 and 42. This protection is necessary in the event there is a nitrogen pressure loss or higher than anticipated ambient temperatures.

The sulfur dioxide vapor conduit 20 diameter must be large enough to allow vapor flow without back pressure, and the length must be sufficient to allow warming of the sulfur dioxide chilled from vaporization at the needle valve 34. Otherwise, flooding of the vapor conduit 44 with liquid sulfur dioxide and ice formation were the vapor conduit enters the must will result.

The sulfur dioxide vapor enters the must at the suction side of the must pump 30, the crusher/stemmer basin, or other suitable location. By entering the must on the low pressure side of the must pump 30, sulfur dioxide vaporization at the needle valve 34 is assured. The action of the pump 30 also assures complete and prompt mixing of sulfur dioxide and must. No noticeable corrosion from sulfur dioxide has been observed on stainless steel, cast iron or aluminum pump parts used with the system of this invention.

This system has proven it can add sulfur dioxide accurately, quickly and evenly with a minimum of operator attention. Thus, the several aforenoted objects and advantages are most effectively attained. Although a single somewhat preferred embodiment of the invention has been disclosed and described in detail herein, it should be understood that this invention is in no sense limited thereby and its scope is to be determined by that of the appended claims.

What is claimed is:

1. The process for relatively quickly applying and evenly distributing a substantially accurate amount of sulfur dioxide continuously to must being pumped through a conduit during a wine making procedure to reduce oxidation and to inhibit the growth of natural wild yeast residing in the must, comprising the steps of: pumping must through a first conduit; providing a source of supply of sulfur dioxide; maintaining the sulfur dioxide under constant and uniform pressure; conducting the sulfur dioxide in a second conduit to the must traveling in the first conduit; providing a source of supply of an inert gas under pressure; delivering the inert gas to the second conduit prior to entry of the sulfur dioxide into the first conduit, and shutting off the flow of the sulfur dioxide in the second conduit while allowing the inert gas to continue to flow under pressure in the first conduit to prevent juice from the must migrating back into the second conduit.

2. The process in accordance with claim 1 wherein the source of supply of sulfur dioxide is maintained under constant and uniform pressure independent of fluctuations in ambient temperature.

3. The process in accordance with claim 1 wherein the flow rate of sulfur dioxide in the second conduit is constantly being monitored.

4. The process in accordance with claim 1 wherein the flow of sulfur dioxide in the second conduit is stopped upon stopping of the travel of must in the first conduit.

5. The process in accordance with claim 1 wherein the rate of flow of sulfur dioxide is adjusted.

* * * * *